(12) United States Patent
Tsubota (10) Patent No.: US 8,312,192 B2
(45) Date of Patent: Nov. 13, 2012

(54) INFORMATION TRANSMISSION SYSTEM, INFORMATION TRANSMISSION DEVICE, INFORMATION TRANSMISSION METHOD AND A COMPUTER READABLE MEDIUM STORING A PROGRAM FOR INFORMATION TRANSMISSION

(75) Inventor: Hirokazu Tsubota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 294 days.

(21) Appl. No.: 12/726,805

(22) Filed: Mar. 18, 2010

(65) Prior Publication Data

US 2011/0004713 A1 Jan. 6, 2011

(30) Foreign Application Priority Data

Jul. 2, 2009 (JP) ................................. 2009-157466

(51) Int. Cl.
*G06F 13/42* (2006.01)
(52) U.S. Cl. .......................... 710/106; 710/105; 710/107
(58) Field of Classification Search .................. 710/107, 710/106
See application file for complete search history.

(56) References Cited

U.S. PATENT DOCUMENTS

| 6,201,829 | B1 * | 3/2001 | Schneider ..................... 375/221 |
| 7,203,853 | B2 * | 4/2007 | Martwick et al. ............. 713/320 |
| 7,426,251 | B1 * | 9/2008 | Huang ........................... 375/355 |
| 2004/0103333 | A1 * | 5/2004 | Martwick et al. ............. 713/400 |
| 2008/0013645 | A1 | 1/2008 | Muto et al. |
| 2008/0137719 | A1 * | 6/2008 | Kawamoto ..................... 375/224 |
| 2009/0041099 | A1 * | 2/2009 | Das Sharma et al. ......... 375/220 |
| 2010/0289955 | A1 * | 11/2010 | Kobayashi ..................... 348/537 |

FOREIGN PATENT DOCUMENTS

| JP | A-9-214720 | 8/1997 |
| JP | A-2008-22392 | 1/2008 |
| JP | A-2008-146457 | 6/2008 |

* cited by examiner

*Primary Examiner* — Ryan Stiglic
(74) *Attorney, Agent, or Firm* — Oliff & Berridge, PLC (57) ABSTRACT

The present invention provides an information transmission system including: a transmission path that transmits information in serial; a first information transmission device including, a transmitting section that transmits the information in the transmission path at a predetermined transmission speed, and a controller that controls the transmitting section to transmit predetermined first information in the transmission path when establishing communication, the first information including a same value in successive plurality of bits; and a second information transmission device including, a receiving section that receives the information transmitted via the transmission path, and a communication establishing section that establishes the communication based on the first information, when the receiving section receives the first information.

20 Claims, 11 Drawing Sheets

| Data Byte Name | Current RD − abcdei fghj | Current RD + abcdei fghj |
|---|---|---|
| D3.1 | 1100011001 | 1100011001 |
| D17.1 | 1000111001 | 1000111001 |
| D0.3 | 1001110011 | 0110001100 |
| D7.3 | 1110001100 | 0001110011 |
| D14.3 | 0111001100 | 0111000011 |
| D17.3 | 1000111100 | 1000110011 |
| D24.3 | 1100110011 | 0011001100 |
| D30.3 | 0111000011 | 1000011100 |
| D14.6 | 0111000110 | 0111000110 |
| D28.6 | 0011100110 | 0011100110 |
| D7.7 | 1110001110 | 0001110001 |
| D24.7 | 1100110001 | 0011001110 |
| D30.7 | 0111100001 | 1000011110 |
| K28.1 | 001111 1001 | 110000 0110 |
| K28.3 | 001111 0011 | 110000 1100 |
| K28.7 | 001111 1000 | 110000 0111 |

| Name | Bit | Current RD− | Current RD+ |
|---|---|---|---|
| D7.3 | 011 00111 | 1110001100 | 0001110011 |

SIGNAL WAVEFORM IN SERIAL TRANSMISSION (2)

| Name | Bit | Current RD− | Current RD+ |
|---|---|---|---|
| D21.0 | 000 10101 | 1010101011 | 1010100100 |

SIGNAL WAVEFORM IN SERIAL TRANSMISSION

INFORMATION TRANSMISSION SYSTEM, INFORMATION TRANSMISSION DEVICE, INFORMATION TRANSMISSION METHOD AND A COMPUTER READABLE MEDIUM STORING A PROGRAM FOR INFORMATION TRANSMISSION

CROSS-REFERENCE TO RELATED APPLICATION

This application is based on and claims priority under 35 USC 119 from Japanese Patent Application. No. 2009-157466 filed Jul. 2, 2009.

BACKGROUND

Technical Field

The present invention relates to an information transmission system, an information transmission device, information transmission method, and a computer readable medium storing a program for information transmission.

SUMMARY

According to an aspect of the invention, there is provided an information transmission system including: a transmission path that transmits information in serial; a first information transmission device including, a transmitting section that transmits the information in the transmission path at a predetermined transmission speed, and a controller that controls the transmitting section to transmit predetermined first information in the transmission path when establishing communication, the first information including a same value in successive plurality of bits; and a second information transmission device including, a receiving section that receives the information transmitted via the transmission path, and a communication establishing section that establishes the communication based on the first information, when the receiving section receives the first information.

BRIEF DESCRIPTION OF THE DRAWINGS

Exemplary embodiments of the present invention will be described in detail based on the following figures, wherein.

DETAILED DESCRIPTION

Hereinafter, an example of an exemplary embodiment of the present invention will be described in detail with reference to the drawings.

Herebelow, in the following description, an example where the present invention is applied to an information transmission system that performs transmission and reception of information between two devices, is described.

Figure 1:
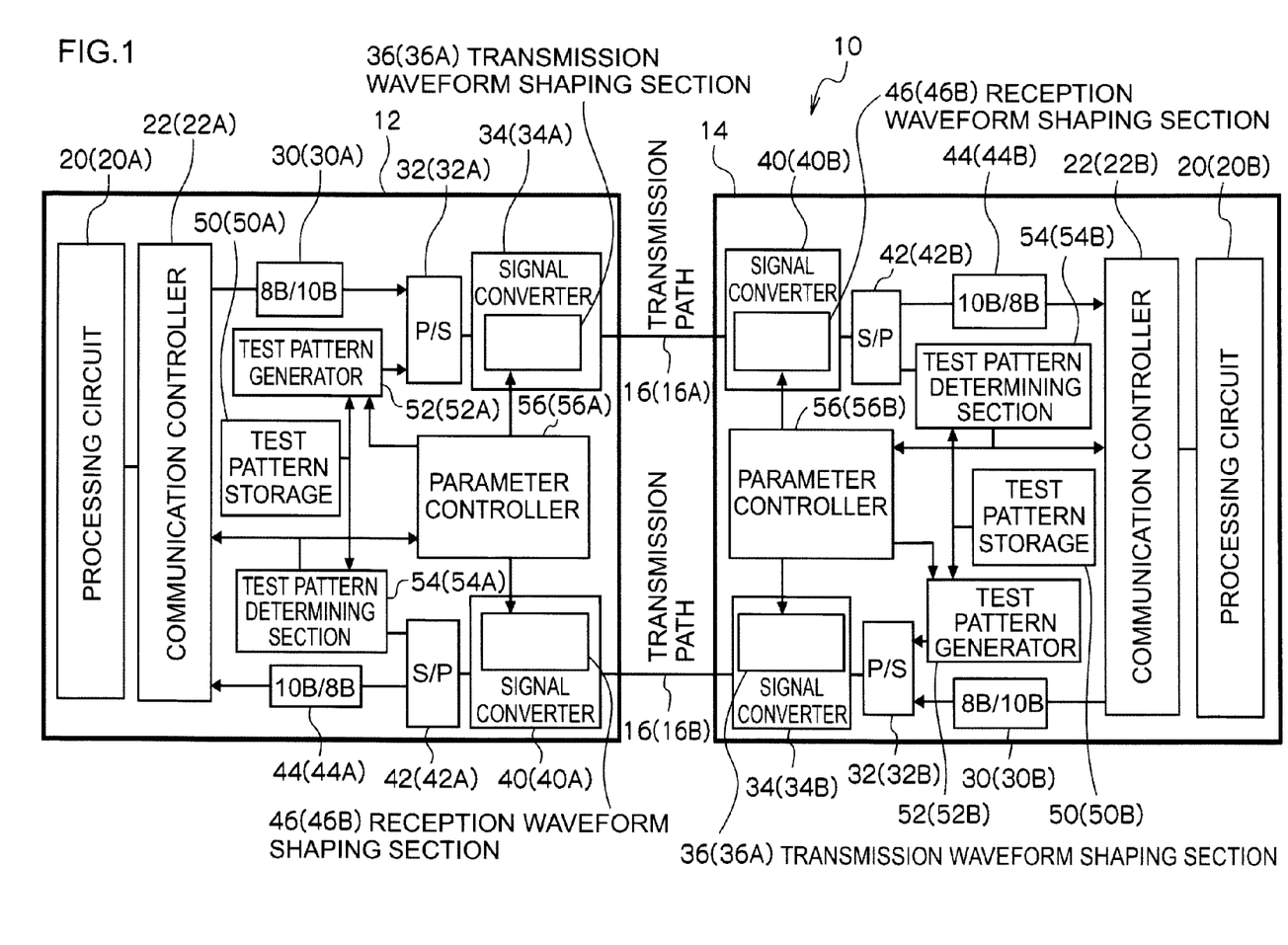
FIG. 1 is a block diagram schematically illustrating an overall configuration of an information transmission system according to an exemplary embodiment.

FIG. 1 illustrates a block diagram schematically illustrating an overall configuration of an information transmission system 10 according to an exemplary embodiment. Note that, a device 12 and a device 14 are of substantially the same configuration. Therefore, in the following, the configuration of the device 12 is mainly used to describe a transmission side of transmitting information. Further, the configuration of the device 14 is mainly used to describe a transmission side of receiving the information. Note that, portions of the transmission side of the device 14 that are identical to portions of the transmission side of the device 12 are allocated the same reference numbers, and the explanation thereof is omitted. Further, portions of the reception side of the device 12 that are identical to portions of the reception side of the device 14 are allocated the same reference numbers, and the explanation thereof is omitted. Further, in the following description, when the same portions of the device 12 and the device 14 are need to be described separately, such portion of the device 12 is denoted by a reference number suffixed with "A" and such portion of the device 14 is denoted by a reference number suffixed with "B".

In the information transmission system 10, the devices 12 and 14 are connected to a pair of transmission paths 16 (16A, 16B). The transmission path 16A transmits information from the device 12 to the device 14. On the other hand, the transmission path 16B transmits information from the device 14 to the device 12. Each of the transmission paths 16 is made of two lines, which are differential lines for transmitting differential signals. The four lines of the transmission path 16A and the transmission path 16B may be bundled up and covered from the outside into one cable. On the other hand, every two lines of the transmission paths 16A and 16B may be bundled up into two cables. In the exemplary embodiment, single pair of transmission path 16A and the single transmission path 16B are provided. However, plural transmission paths may be arranged in parallel, to speed up the data transmission between the devices.

The device 12 includes a processing circuit 20 and a communication controller 22. The processing circuit 20 is designed in accordance with the purpose of the device. The communication controller 22 controls transmission and reception of the information between the communication controller 22 and external devices. The communication controller 22 includes a protocol for communication control. The communication controller 22 controls operations relating to the communication by a flow control, which is implemented by hard control. The communication controller 22 receives information which is a subject of the transmission, from the processing circuit 20. The communication controller 22 outputs information transmitted from the external device to the processing circuit 20.

Further, at the transmission side of transmitting information, the device 12 includes an 8B/10B encoder (8B/10B) 30, a parallel/serial converter (P/S) 32 and a signal converter 34. The output side of the communication controller 22 is connected to the 8B/10B encoder 30. The output side of the 8B/10B encoder 30 is connected to the parallel/serial converter 32. Further, the output side of the parallel/serial converter 32 is connected to the signal converter 34.

The 8B/10B encoder 30 performs 8B/10B encoding on data, input from the communication controller 22. The 8B/10B encoder 30 stores 10-bit patterns corresponding to 8-bit information in advance. The 8B/10B encoding is performed by selecting a pattern for conversion such that there is an even balance of 1 and 0 in serial data.

The parallel/serial converter 32 converts the data encoded by the 8B/10B encoder 30 into a serial bit sequence, and outputs the serial bit sequence to the signal converter 34.

The signal converter 34 converts the digital bit sequence, input from the parallel/serial converter 32, into an electric signal, and outputs to the transmission paths 16. Here, with recent micro technique, the operation till the 8B/10B encoder 30 is performed at around 1.0 V. The signal converter 34 amplifies the digital data operating at around 1.0 V to an electric signal at around 3.3 V to output. The signal converter 34 is provided with a transmission waveform shaping section 36. According to set parameters (setting information), the transmission waveform shaping section 36 shapes a signal waveform by performing at least one of partial amplification (pre-emphasis) of a signal waveform output to the transmission paths 16 and/or partial attenuation (de-emphasis) of the signal waveform.

At the reception side of receiving information, the device 14 includes a signal converter 40, a serial/parallel converter (S/P) 42 and an 8B/10B decoder (10B/8B) 44. The output side of the signal converter 40 is connected to the serial/parallel converter 42. The output side of the serial/parallel converter 42 is connected to the 8B/10B decoder 44. The output side of the 8B/10B decoder 44 is connected to the communication controller 22.

The signal converter 40 converts the electric signal received from the transmission paths 16 into digital serial data. This signal converter 40 is provided with a reception waveform shaping section 46. The reception waveform shaping section 46 includes an equalizer therein. The reception waveform shaping section 46 shapes a signal waveform by partially emphasizing the received signal waveform and/or partially attenuating the signal waveform, in accordance with set parameters (setting information).

The serial/parallel converter 42 converts the serial data converted by the signal converter 40 into parallel bit sequences, and outputs to the 8B/10B decoder 44.

The 8B/10B decoder 44 performs 8B/10B decoding on the parallel data converted by the serial/parallel converter 42, and outputs to the communication controller 22.

Further, the device 12 includes a test pattern storage 50, a test pattern generator 52, a test pattern determining section 54 and a parameter controller 56. The test pattern generator 52 is connected to the parallel/serial converter 32 and the test pattern storage 50. The test pattern determining section 54 is connected to the serial/parallel converter 42 and the test pattern storage 50. The parameter controller 56 is connected to the transmission waveform shaping section 36, the reception waveform shaping section 46, the test pattern generator 52, and the test pattern determining section 54.

The test pattern storage 50 stores in advance, pattern information that indicates plural test patterns used in a transmission quality test, and order information that indicates a transmission order of the test pattern. The test pattern information may be information of the test pattern itself, or information such as arithmetic expression for deriving the test pattern.

The test pattern generator 52 generates data (second information) for transmission quality test of the test pattern, indicated by the pattern information in the transmission order indicated by the order information, stored in the test pattern storage 50. Next, the test pattern generator 52 outputs the data for transmission quality test, to the parallel/serial converter 32. This data for transmission quality test is the data in which a value of each bit at least a part thereof is changed per bit for testing the transmission quality. When receiving the data for transmission quality test from the test pattern generator 52, the parallel/serial converter 32 converts the received data into a serial bit sequence and outputs to the signal converter 34.

The test pattern determining section 54 receives data from the serial/parallel converter 42 and compares with the test pattern data to obtain a BER (Bit Error Rate). The test pattern data is indicated by the pattern information corresponding to the transmission order indicated by the order information stored in the test pattern storage 50. Next, the test pattern determining section 54 outputs the obtained BER to the communication controller 22 and the parameter controller 56.

The parameter controller 56 control the settings of the parameters in the reception waveform shaping section 46 and the transmission waveform shaping section 36. The parameter controller 56 uses the result of the transmission quality test, executed by the test pattern determining section 54, to set the parameters in the reception waveform shaping section 46 and the transmission waveform shaping section 36, to achieve the communicable transmission quality. The parameters set in the reception waveform shaping section 46 and the transmission waveform shaping section 36 may be parameters that bring the highest transmission quality. On the other hand, the parameters may be set by selecting from those of which that brings the transmission quality to at least at the predetermined communicable level.

Next, in the following description, establishment of communication in the information transmission system 10 according to the exemplary embodiment is described.

First, establishment of communication in PCI Express is described.

Figure 2:
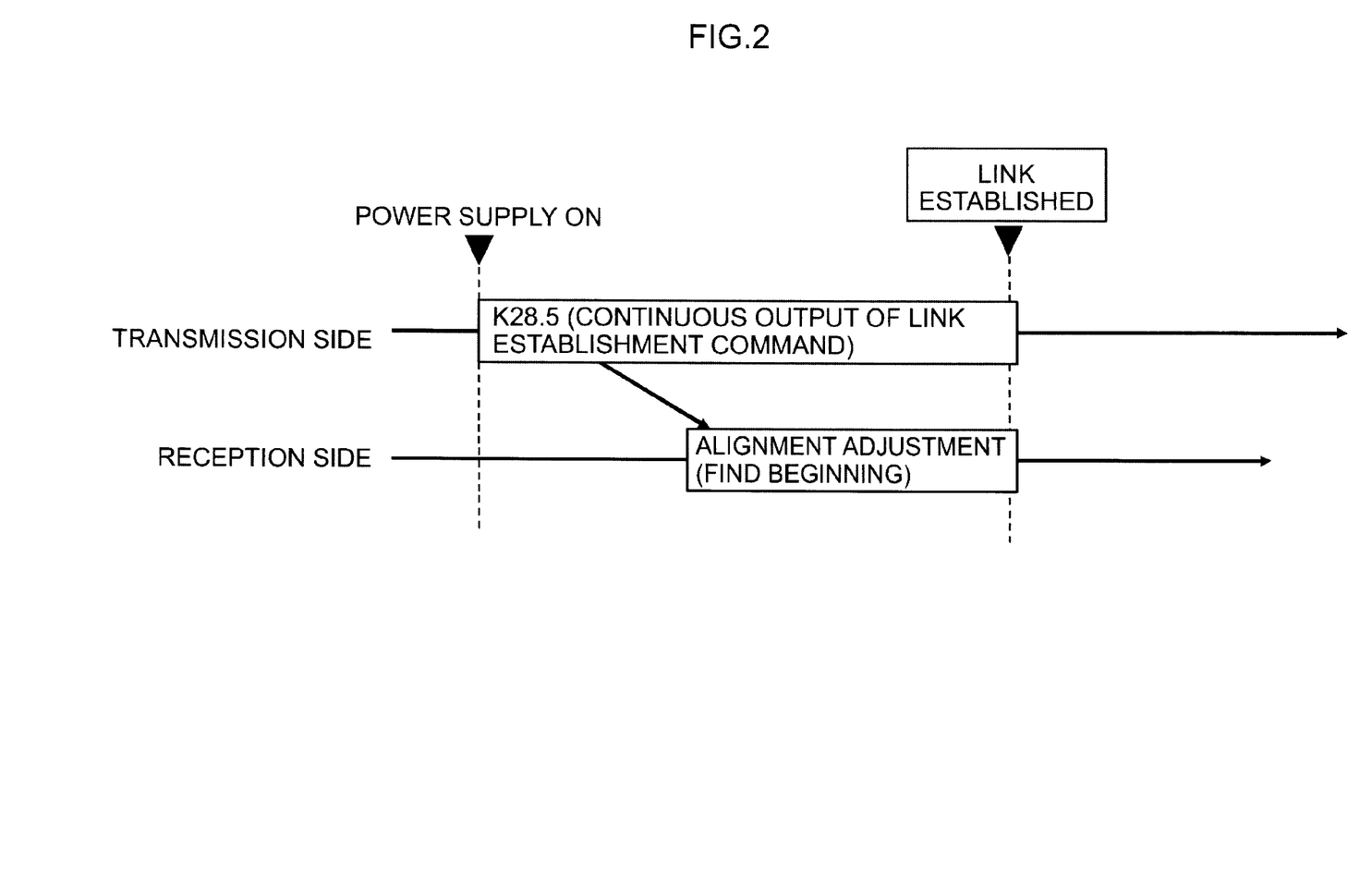
FIG. 2 is a schematic view illustrating processing flows of the transmission side and the reception side when communication in PCI Express is established.

In order to establish communication in the PCT Express, as illustrated in FIG. 2, the transmission side repeatedly transmits data of K28.5 as information for communication establishment. The reception side compares the received data with the data of K28.5 and finds the beginning of a match position (i.e., alignment adjustment). Next, the reception side establishes the communication by controlling the synchronization of the data, based on the match position.

Here, note that, loss characteristics of the signal waveform differs by the types of the cable used, the distance of the cable used, and intended purpose of the transmission paths 16. Further, when the cable length of each transmission path 16 is changed while maintaining constant transmission speed (for example 5 Gbps), the signal waveform changes due to the cable loss, and therefore, information transmission becomes disapproval.

In the information transmission system 10 according to the exemplary embodiment, when establishing communication, information (first information) for communication establishment that has a same value in successive bits (i.e., for example, successive 2 bits or more has the same value) is transmitted.

Figure 3:
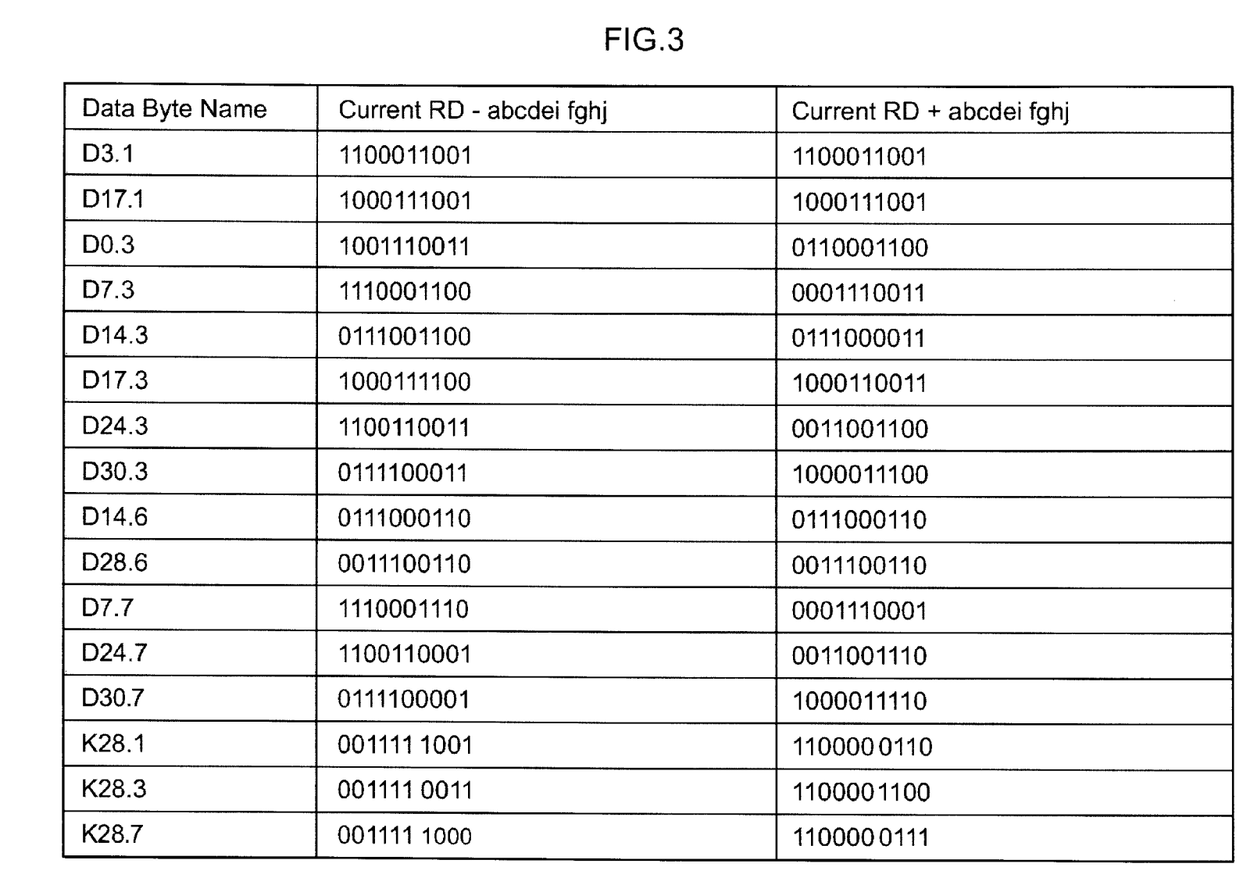
FIG. 3 is a view illustrating candidates of information for communication establishment in D codes for 8B/10B conversion.

FIG. 3 illustrates the candidates of the information for communication establishment within D code and K code for 8B/10B conversion. Note that, in 8B/10B conversion, two patterns of 10 bit information (current RD+ and current RD−) is predefined for each 8 bit information. In 8B/10B conversion, when converting the 8 bit information into 10 bit information, the appearance ratio of the value 1, 0 is used as a basis to select a pattern out of Current RD+ or Current RD−, so as to balance the appearance rate of the value 1 and 0 within the serial data.

D7.3, D24.3, D28.3 and D28.7 have the same value in successive bits in both Current RD+ and Current RD− pattern.

In addition, D0.3, D14.3, D17.3, D30.3, D7.7, D24.7, D30.7 and D28.1 do not have same value in successive bits in first bit or last bit in at least one pattern of Current RD+ or current RD−. However, by transmitting data that has the same value with the first bit or last bit, next to the first bit or last bit, same value in successive bits can be achieved.

In addition, in D3.1, D17.1, D14.6 and D28.6, the same values do not continue at least in the last bit or the first bit. However, in the exemplary embodiment, since Current RD+ and Current RD− of D3.1, D17.1, D14.6 and D28.6 have the same patterns, for example, if D17.1 is made to follow D3.1, the data including same values as the last bit and the first bit continues. Due thereto, in the exemplary embodiment, D3.1, D17.1, D14.6 and D28.6 are also extracted as the candidates.

Due thereto, in the exemplary embodiment, if the same values do not continue in the first bit or last bit individually, a pattern that has the same value in successive bits are extracted in accordance with the following data.

Figure 4:
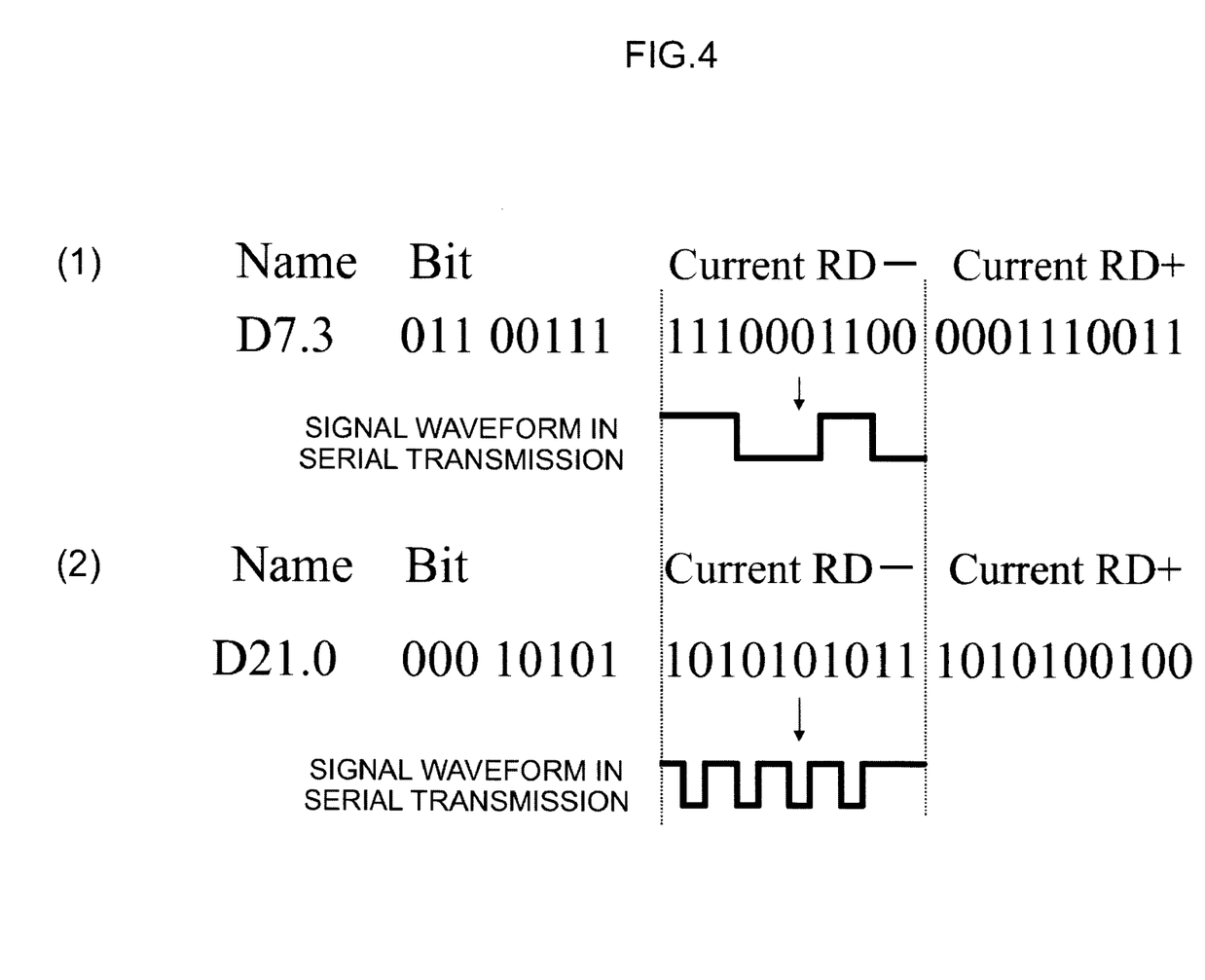
FIG. 4 is a view illustrating 8 bit data, 10 bit Current RD− data, 10 bit Current RD+ data, and a signal waveform of the 10 bit Current RD− data, of D7.3 and D21.0.

(1) of FIG. 4 illustrates 8 bit data, 10 bit Current RD− data, 10 bit Current RD+ data and a signal waveform of 10 bit Current RD− data, of D7.3. In addition, (2) of FIG. 4 illustrates 8 bit data, 10 bit current RD− data, 10 bit Current RD+ data and a signal waveform of 10 bit Current RD− data, of D21.0.

As illustrated in (1) of FIG. 4, the data of Current RD− of D7.3 have the same value in successive plural bits. Therefore, the timing of change in the signal waveform is tempered.

Besides D code of 8B/10B conversion, for example, K28.3 in control K code can be also used as a candidate for information for communication establishment.

Figure 5:
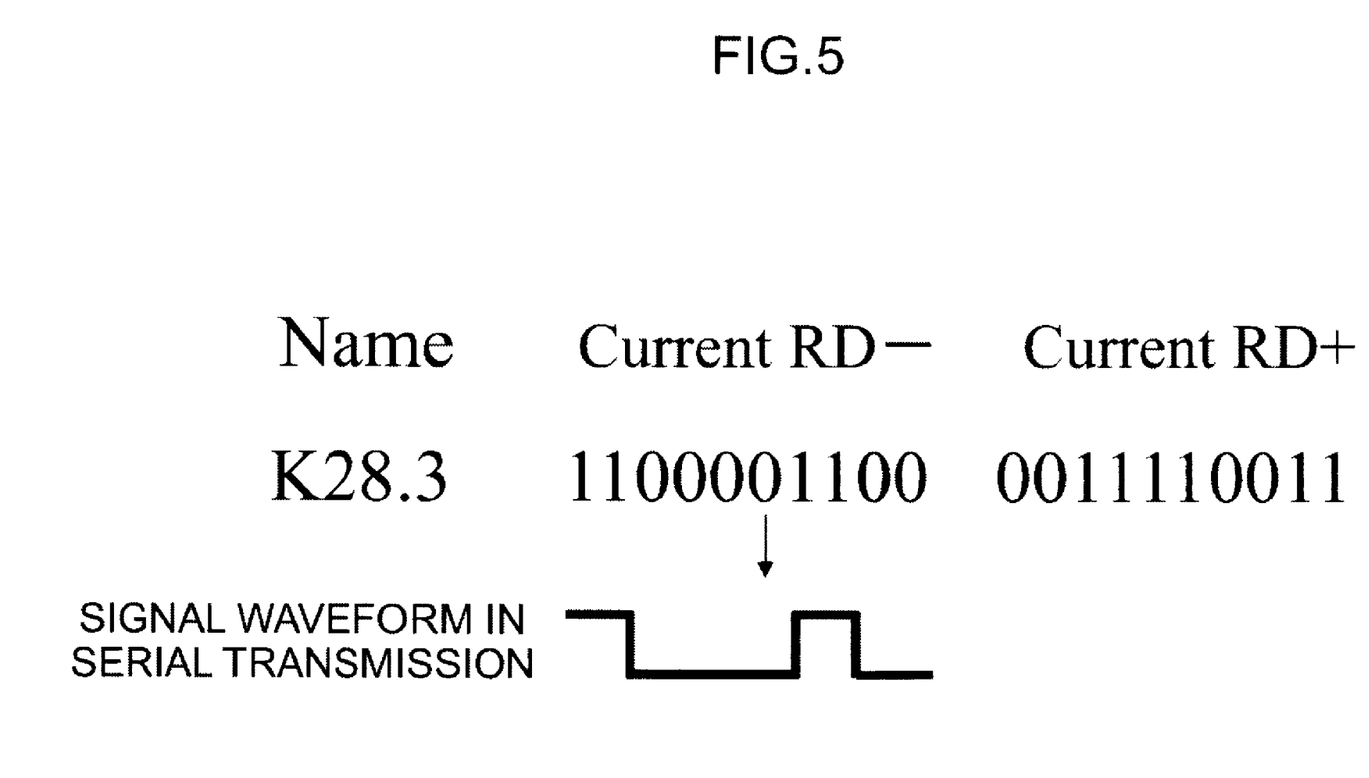
FIG. 5 is a view illustrating 10 bit Current RD− data, 10 bit Current RD+ data and a signal waveform of the 10 bit Current RD− data of K28.3.

FIG. 5 illustrates 10 bit Current RD− data, 10 bit Current RD+ data and a signal waveform of 10 bit Current RD− data, of K.28.3.

Namely, if the same signal levels continue in plural bits in serial transmission, it is equal to pseudo delay of the transmission speed. Therefore, in the information transmission system according to the exemplary embodiment, there is no need to change the actual transmission speed.

Figure 6:
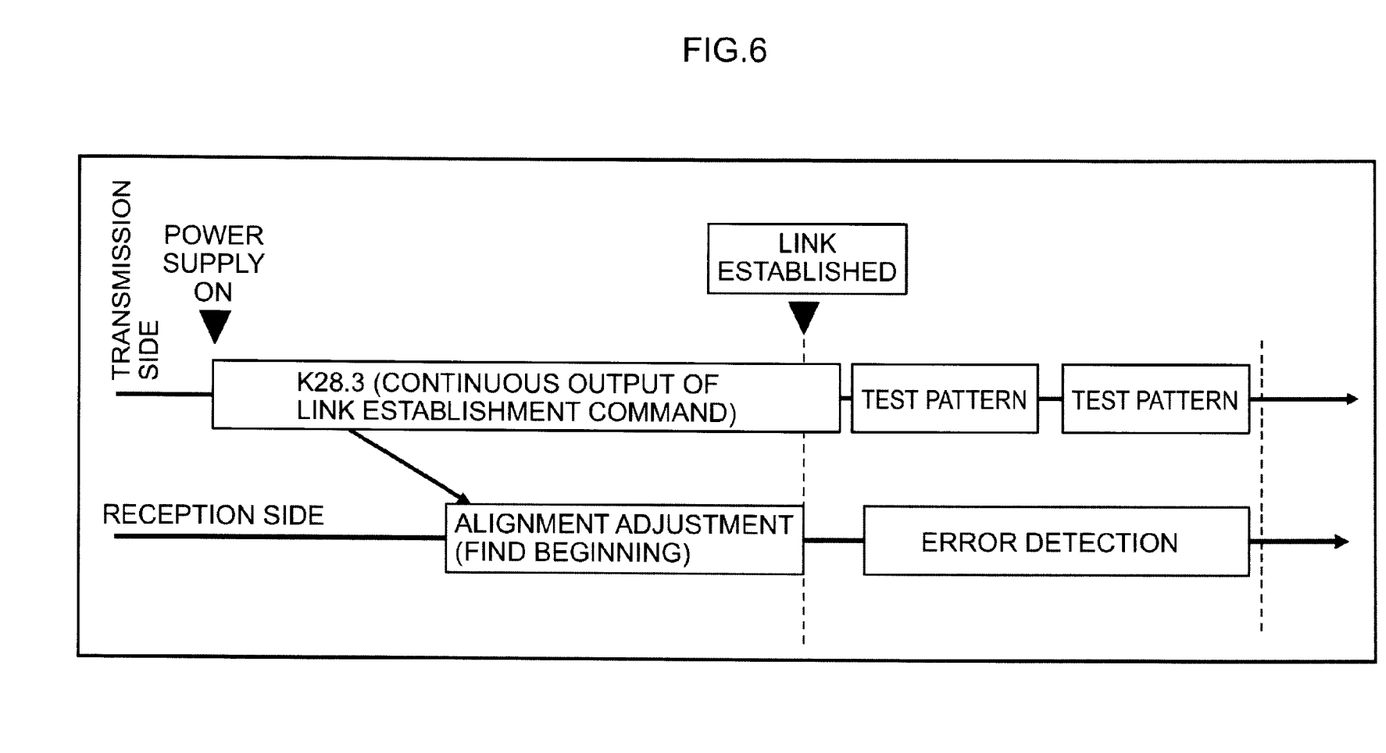
FIG. 6 is a schematic view illustrating processing flows at the transmission side and the reception side when establishing communication in the information transmission system according to the exemplary embodiment.

For example, when K28.3 is used as information for communication establishment, as illustrated in FIG. 6, the transmission side repeatedly transmits data of K28.3 as information for communication establishment. Then, the reception side compares the received data with the data of K28.3 and finds the beginning of a match position. Then, the reception side performs synchronization control of data, based on the matched position thereby to establish communication.

When the communication is established as described above, data for transmission quality test having the test pattern indicated by the pattern information, is then transmitted to perform a test for transmission quality.

Note that, in the above, a case where the parallel data has a bit width of 8 bits has been described. However, the generally-used bit width is 16 bits, 32 bits or the like.

Figure 7:
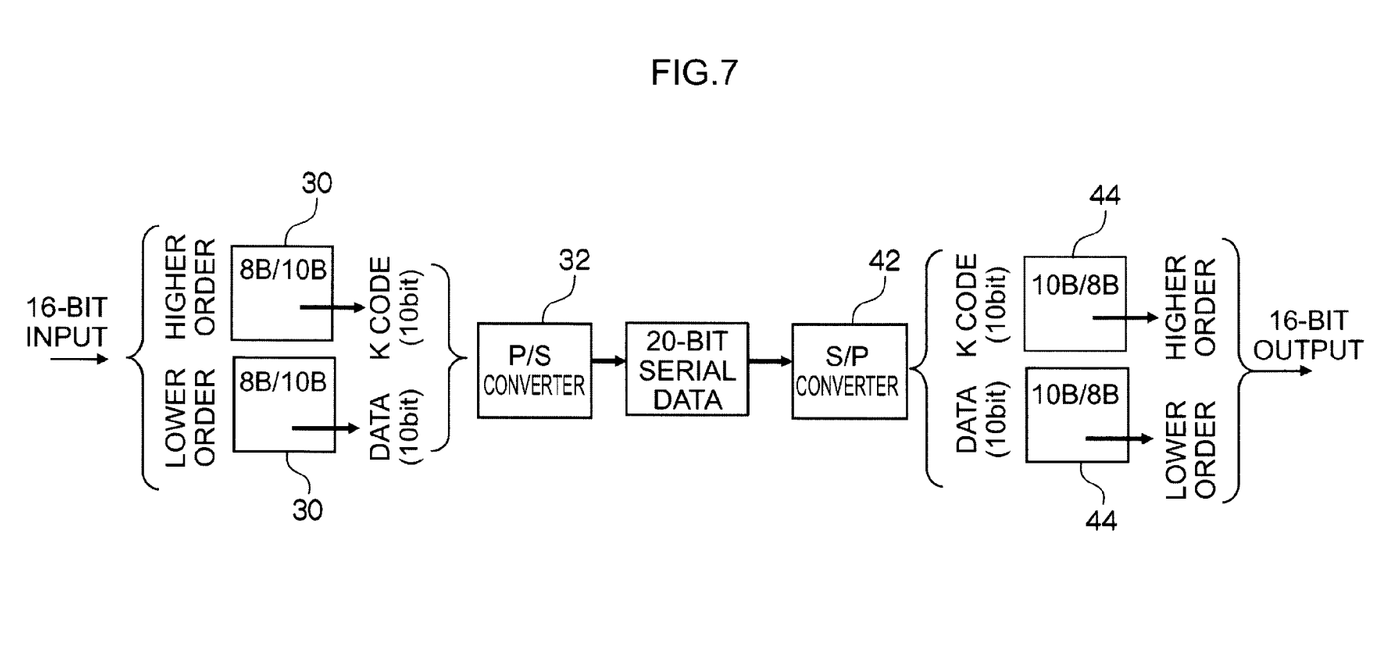
FIG. 7 is a schematic view illustrating a data flow when a bit width of 16 bits is used in the information transmission system according to the exemplary embodiment.

As illustrated in FIG. 7, when the bit width is 16 bits, for example, the transmission side may be configured to have the 8B/10B encoder 30 in parallel. Further, the 8B/10B encoder 30 may convert each first 8 bits and last 8 bits into 10 bits. Furthermore, the parallel/serial converter 32 may convert the parallel data into serial data in unit of 20 bits.

Meanwhile, when the bit width is 16 bits, at the reception side may be configured to have the 8B/10B decoder 44 in parallel. Further, the serial/parallel converter 42 may convert transmitted serial information into parallel data in unit of 20 bits. Furthermore, the 8B/10B decoder 44 may convert each first 10 bits and last 10 bits into 8 bits.

Figure 8:
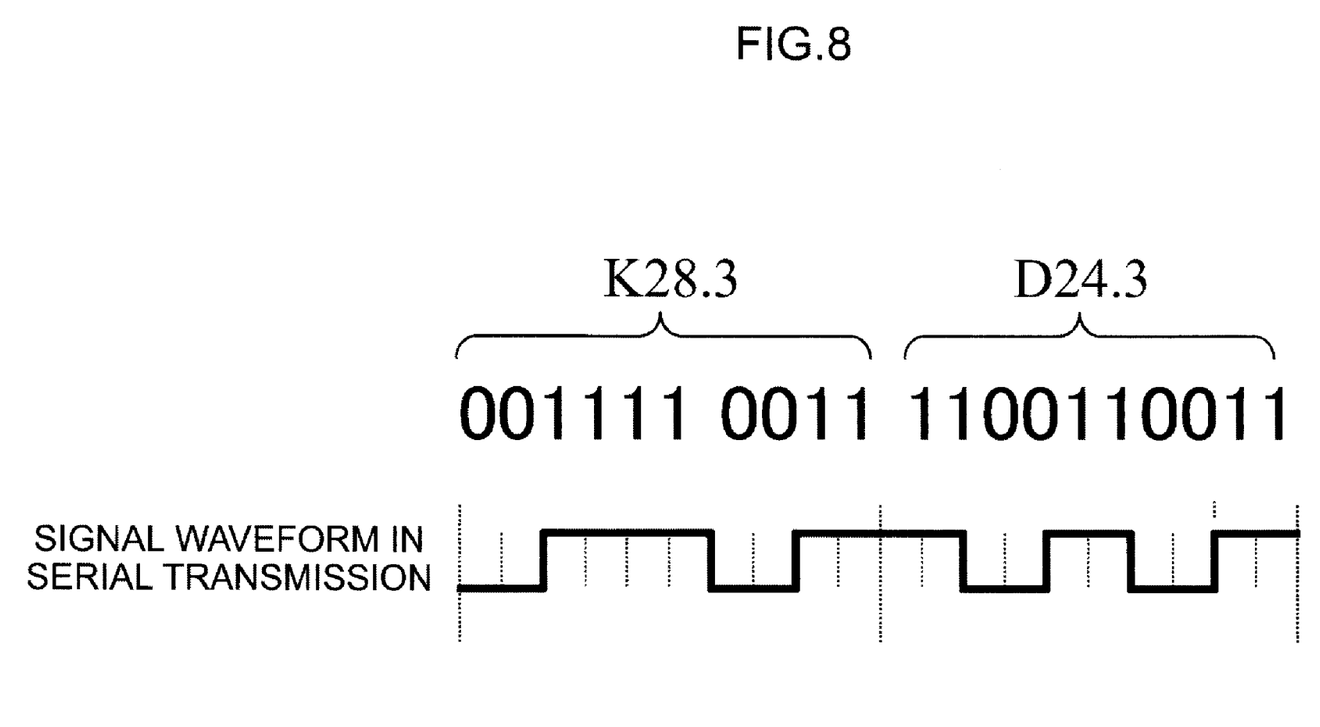
FIG. 8 is a view illustrating a signal waveform and a data when a data of K28.3 is followed by a data of D24.3.

With the above-described configuration, even when the bit width used is 16 bits, the data having the same value in successive plural bits can be used as information for communication establishment. For example, as illustrated in FIG. 8, when K28.3 data is followed by D24.3 data (K28.3+D24.3), the conditions described above can be satisfied.

Next, the operation of the information transmission system 10 according to the exemplary embodiment will be described.

When transmitting information to the device 14, the device 12 repeatedly transmits predetermined information for communication establishment via the transmission path 16A, thereby to request the device 14 to establish communication. On the other hand, when transmitting information to the device 12, the device 14 repeatedly transmits predetermined information for communication establishment via the transmission path 16B, thereby to request the device 12 to establish communication.

Figure 9:
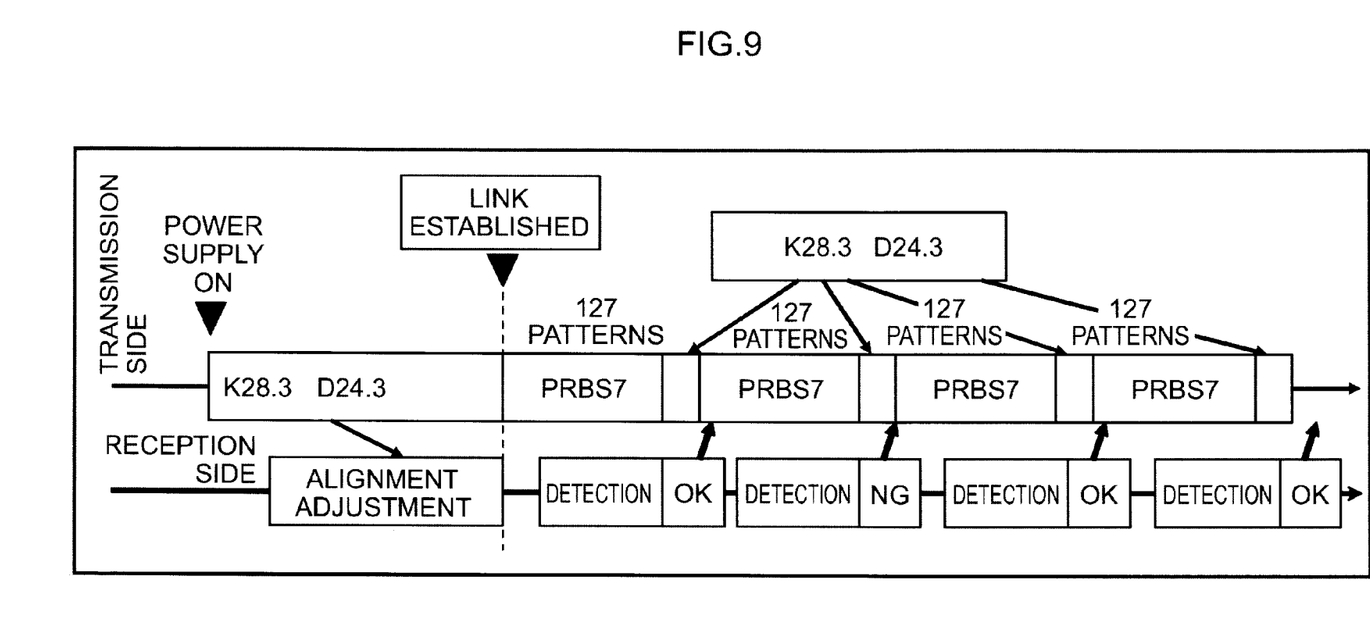
FIG. 9 is a schematic view illustrating process flows at the transmission side and the reception side when establishing communication in the information transmission system according to the exemplary embodiment.

As illustrated in FIG. 9, for example, when K28.3+D24.3 is used as information for communication establishment, the transmission side repeatedly transmits the data of K28.3+D24.3. On the other hand, the reception side compares the received data with the data of K28.3+D24.3, and finds the beginning of a match position. Further, the reception side uses the match position as a basis to perform data synchronization control or the like, and therefore establishes the communication.

Then, in order to test the transmission quality, the transmission side transmits the data of test pattern without change in transmission speed. The reception side compares the received data with test pattern data to obtain the BER.

This test pattern is a pattern selected out of a pattern that contains many changes, or a pattern which is likely to be an error. Note that, in the above, for the BER test, a test pattern that has a portion where value of each bit is changed per bit, is used.

Note that, PRBS (Pseudo random Bit Sequence) is known as a test pattern often used when detecting the BER. Namely, when the 8B/10B conversion is used, PRBS $2^7-1$ is often used as a test pattern. In PRBS $2^7-1$, the transmission quality is tested by transmitting 127 test patterns.

FIG. 9 illustrates the testing of the transmission quality by using PBRS $2^7-1$ (which is "PBRS 7" in FIG. 9), according to the exemplary embodiment. Further, in the exemplary embodiment, the transmission side transmits the data of K28.3+D24.3 (third information) as separating information that indicates a separation of one group of test patterns, each time the data of 127 test patterns is transmitted. The reception side compares the received data with data of corresponding test patterns, and obtains the BER. Namely, note that, the data of 127 test patterns corresponds to second information.

Accordingly, the transmission side repeatedly transmits the data of 127 test patterns and the data of K28.3+D24.3.

The reception side determines whether the BER is above a predetermined level which is suitable for communication establishment. Then, the reception side transmits the determination result of the transmission quality from the other transmission path 16 to the transmission side (when the transmission quality of the transmission path 16A is tested, the result is transmitted via the transmission path 16B, on the other hand when the transmission quality of the transmission path 16B is tested, the result is transmitted via the transmission path 16A). In the exemplary embodiment, the test result is transmitted as acceptable or not acceptable (e.g., when acceptable, the data of K28.7+D7.3 (fifth information) is transmitted, on the other hand when not acceptable, the data of K28.7+D24.3 (fifth information) is transmitted). The data of K28.7+D7.3 and the data of K28.7+D24.3 have the same values in successive plural bits.

Further, the transmission side can obtain data for parameter setting by receiving the test result.

Each time the reception side receives the data of K28.3+D24.3, the reception side changes the parameters of the transmission waveform shaping section 36 and the parameters of the reception waveform shaping section 46, in a predetermined order. Then, the reception side again performs the transmission quality test by using all the test patterns.

Next, process of the communication establishment will be described in detail. Note that, hereinafter, the process at the transmission side and the process at the reception side will be described separately.

Figure 10:
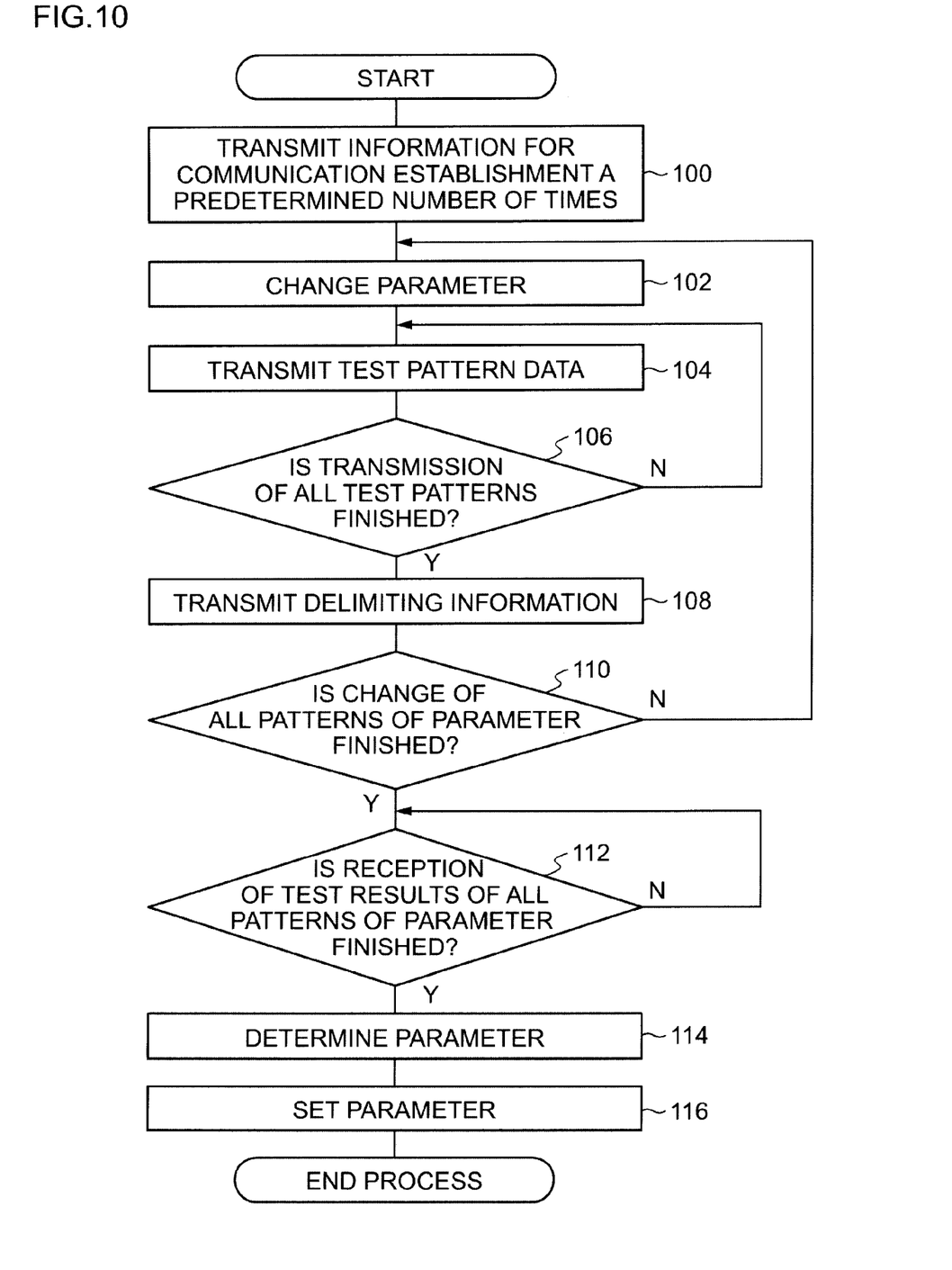
FIG. 10 is a flow chart illustrating a process flow at the transmission side when establishing communication in the information transmission system according to the exemplary embodiment.

FIG. 10 illustrates a flow of information transmission process at the transmission side when establishing communication.

In step 100, the data of K28.3+D24.3 is transmitted as information for communication establishment for a predetermined number of times (for example, 10 times).

In step 102, the parameters of the transmission waveform shaping section 36 are changed. The parameters of the transmission waveform shaping section 36 are changed in the predetermined order, each time when the process of step 102 is performed. Note that, the parameters of the transmission waveform shaping section 36 and the parameters of the reception waveform shaping section 46 may be changed at random, each time the process of step 102 is performed.

In step 104, the data of test patterns shown by pattern information are sequentially generated in the order shown by the order information, and the generated test pattern data is transmitted sequentially.

In step 106, it is determined whether transmission of all test patterns is finished. When the determination is affirmative, the process proceeds to step 108. On the other hand, when the determination is negative, the process proceeds to step 104.

In step 108, the data of K28.3+D24.3 (third information) is transmitted as separation information indicating a separation of one group of test patterns.

In step 110, it is determined whether change of all parameters is finished. When the determination is affirmative, the process proceeds to step 112. On the other hand, when the determination is negative, the process proceeds to step 102.

In step 112, it is determined whether test results of all patterns of the parameters changed in the predetermined order are received from the reception side. When the determination is affirmative, the process proceeds to step 114. On the other hand, when the determination is negative, the process returns to step 112, and awaits for reception of all test results.

In step 114, the received test results are used as a basis to obtain the parameters of the transmission waveform shaping section 36 that can achieve communicable transmission quality.

In step 116, the parameter obtained in the above step 114 is set in the transmission waveform shaping section 36 and the process is ended.

Figure 11:
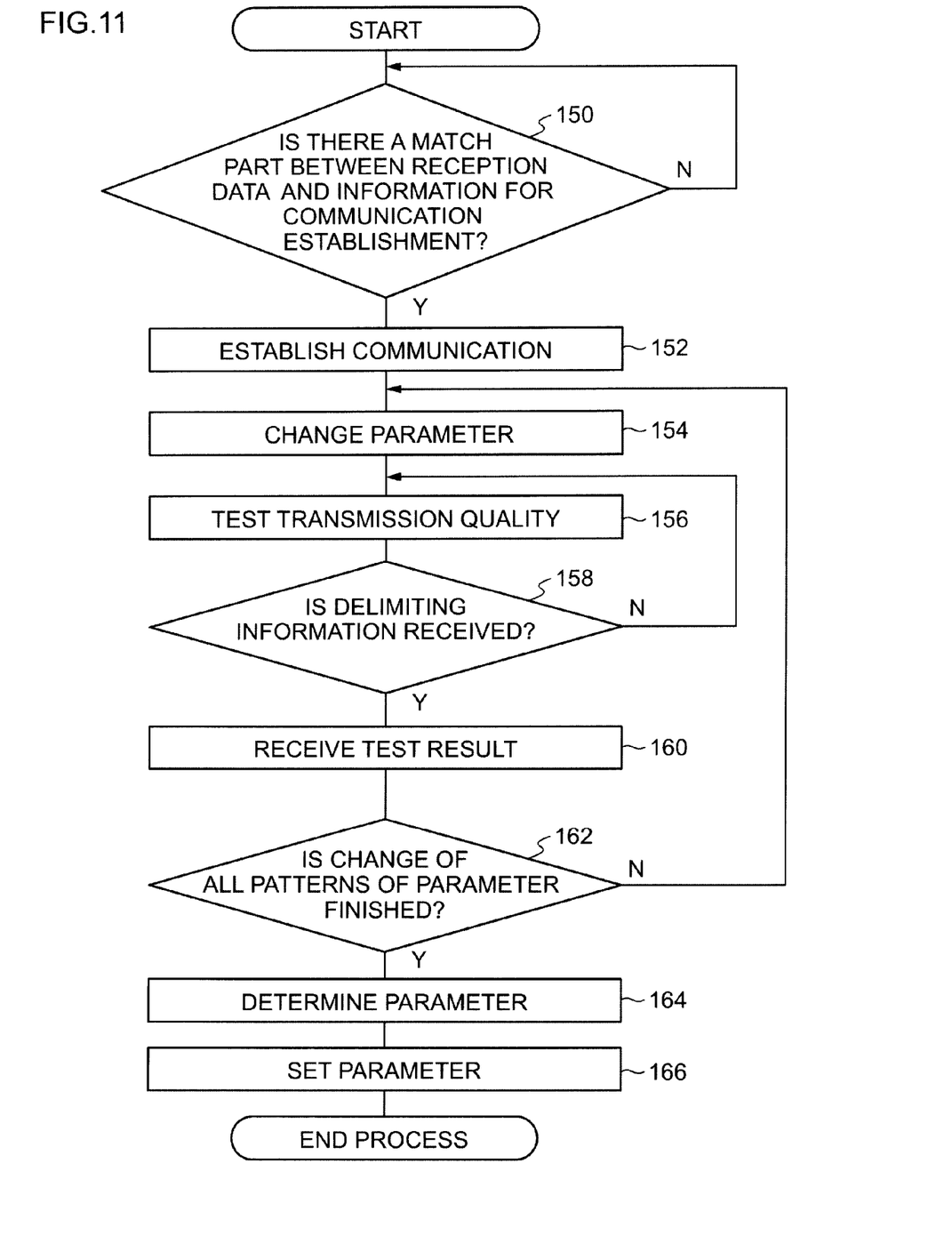
FIG. 11 is a flow chart illustrating a process flow at the reception side when establishing communication in the information transmission system according to the exemplary embodiment.

On the other hand, FIG. 11 illustrates a flow of information transmission process at the reception side when establishing communication.

In step 150, the received data is compared with the data of K28.3+D24.3 and is determined whether there is a matching portion therebetween. When the determination result is affirmative, the process proceeds to step 152. On the other hand, when the determination result is negative, the process returns to step 150, and waits for the reception of information for communication establishment.

In step 152, the matched position is used as a basis to perform data synchronization, and thereby to establish communication.

In step 154, the parameters of the reception waveform shaping section 46 is changed. The parameters of the reception waveform shaping section 46 are changed in the predetermined order each time when the process of step 154 is performed. Note that, the parameters of the reception waveform shaping section 46 may be changed at random, each time when the process of step 152 is performed.

Here, when the parameter of the transmission waveform shaping section 36 and the parameter of the reception waveform shaping section 46 are changed simultaneously, which change of the parameters has effected the transmission quality, may not be determined. Therefore, the change order is set such that the parameters of the transmission waveform shaping section 36 and the parameters of the reception waveform shaping section 46 are changed separately, or by turns.

In step 156, the received data is compared with the data of the test patterns indicated by pattern information corresponding to the transmission order in the order information, to obtain the BER.

In step 158, it is determined whether the data of K28.3+D24.3 is received as separating information. When the determination is affirmative, the process proceeds to step 160. On the other hand, when the determination is negative, the process proceeds to step 156.

In step 160, it is determined whether the BER obtained in step 156 is over a predetermined level which is suitable for establishing communication, and thereafter the determination result is transmitted.

In step 162, it is determined whether changes of all patterns of parameters are completed. When the determination is affirmative, the process proceeds to step 164. On the other hand, when the determination is negative, the process proceeds to step 154.

In step 164, the determination result obtained in the above step 160 is used as a basis to obtain the parameters of the reception waveform shaping section 46 for communicable transmission quality.

In step 166, the parameters obtained in the above step 164 are set in the reception waveform shaping section 46 and the process is ended.

In the above-described exemplary embodiment, a case where the parameters are changed each time the data of 127 test patterns are transmitted, has been described. However, the present invention is not limited thereto. For example, in an alternative exemplary embodiment, the parameters of the transmission waveform shaping section 36 may be changed each time the data of 127 test patterns are transmitted plural times (for example, twice). In this alternative exemplary embodiment, the parameters of the reception waveforms shaping section 46 may be changed each time the data of K28.3+D24.3 are received as the separating information plural time (for example, twice). Accordingly, by using the 127 test patterns plural times when testing, the alternative exemplary embodiment can improve the test accuracy.

Further, in step 112 of the information transmission process in the above-described exemplary embodiment, a case where reception of the test results of all patterns of parameters changed in the predetermined order, is awaited, has been described. However, the present invention is not limited thereto. For example, in an alternative exemplary embodiment, the information transmission process at the reception side may notify the information transmission process at the transmission side, the finish of the test, when the change of the parameter in the predetermined order has completed. In this case, the information transmission process at the reception side may wait for the notice of the complete of the test.

Further, in the above-described exemplary embodiment, a case where the parameters of the reception waveform shaping section 46 are changed when the K28.3+D24.3 data are received as the separating information at the reception side, has been described. However, the present invention is not limited thereto. For example, in an alternative exemplary embodiment, transmission side may transmit instruction information (fourth information) that instructs the change of the parameters, and that has a same value in successive plural bits. In this alternative exemplary embodiment, the reception side may change the parameter when the instruction information is received.

Further, in the above-described exemplary embodiment, a case where the transmission waveform shaping section 36 is provided at the transmission side and the reception waveform shaping section 46 is provided at the reception side, has been described. However, the present invention is not limited thereto. For example, in an alternative exemplary embodiment, either one of the transmission waveform shaping section 36 or the reception waveform shaping section 46, may be provided.

Further, in the above-described exemplary embodiment, a case where PRBS $2^7-1$ is used as the test patterns, have been described. However, the test patterns are not limited to PRBS $2^7-1$.

Further, in the above-described exemplary embodiment, a case where the information for establishing communication, the separating information, and the information used in transmitting the test results, are configured to include 8B/10B converted D codes and K codes, has been described. However, the present invention is not limited thereto.

Furthermore, a program that executes the information transmission processes shown in FIG. 10 and FIG. 11 according to the above-described exemplary embodiment, may be stored in advance in a storage such as (HDD Hard Disk Drive), stored in a memory device such as ROM, stored in a computer readable storage medium such as CD-ROM or DVD-ROM, may be provided or distributed via wire or wireless communication, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information transmission system comprising:
a transmission path that transmits information in serial;
a first information transmission device including,
    a transmitting section that transmits the information in the transmission path at a predetermined transmission speed, and
    a controller that controls the transmitting section to transmit predetermined first information in the transmission path when establishing communication, the first information including a same value in successive plurality of bits; and
a second information transmission device including,
    a receiving section that receives the information transmitted via the transmission path, and
    a communication establishing section that establishes the communication based on the first information, when the receiving section receives the first information, wherein
the controller, after transmission of the first information, controls the transmitting section to transmit second information including a portion where value of each bit changes per bit, and
the second information transmission device further includes:
    a test section that tests a transmission quality based on the second information received at the receiving section,
    a reception waveform shaping section that shapes a signal waveform of the information received by the receiving section in accordance with setting information, and
    a setting section that sets the setting information based on a test result to achieve communicable transmission quality.

2. The information transmission system according to claim 1, wherein the controller, each time the second information is transmitted predetermined number of times, controls to transmit predetermined third information including a same value in successive plurality of bits, and
the setting section changes the setting information, when the third information is received at the receiving section.

3. The information transmission system according to claim 1, wherein the controller controls to transmit fourth information including a same value in successive plurality of bits and instructs to change the setting information, and
the setting section changes the setting information, when the fourth information is received at the receiving section.

4. The information transmission system according claim 1, wherein
the transmission path includes a first transmission path that transmits the information from the first information transmission device to the second information transmission device and a second transmission path that transmits the information from the second information transmission device to the first information transmission device,
the transmitting section transmits the information to the first transmission path,
the receiving section receives the information transmitted via the first transmission path, the second information transmission device further includes,
    a test result transmitting section that transmits fifth information to the second transmission path at the transmission speed, the fifth information includes a same value in successive plurality of bits and shows the test result of the test section, and
the first information transmission device further includes,
    a test result receiving section that receives the fifth information, and
    a transmission waveform shaping section that shapes a signal waveform of the information transmitted from the transmitting section according to the fifth information.

5. The information transmission system according to claim 1, wherein the reception waveform shaping section shapes the signal waveform by at least one of partially emphasizing the received signal waveform and partially attenuating the received signal waveform.

6. An information transmission device comprising:
    a transmitting section that transmits information at a predetermined transmission speed in a transmission path that transmits information in serial; and
    a controller that controls the transmitting section to transmit predetermined first information in the transmission path when establishing communication, the first information including a same value in successive plurality of bits, wherein
    the controller, after transmission of the first information, controls the transmitting section to transmit second information including a portion where value of each bit changes per bit, and
    the first and second information are received by a second information transmission device that includes:
        a test section that tests a transmission quality based on the second information received,
        a reception waveform shaping section that shapes a signal waveform of the information received in accordance with setting information, and
        a setting section that sets the setting information based on a test result to achieve communicable transmission quality.

7. The information transmission device according to claim 6, wherein the reception waveform shaping section shapes the signal waveform by at least one of partially emphasizing the received signal waveform and partially attenuating the received signal waveform.

8. An information transmission device comprising:
    a receiving section that receives information transmitted via a transmission path that transmits information in serial;
    a communication establishing section that establishes the communication based on first information, when the receiving section receives predetermined first information including a same value in successive plurality of bits;
    a test section that tests a transmission quality based on second information received at the receiving section;
    a reception waveform shaping section that shapes a signal waveform of the information received by the receiving section in accordance with setting information; and
    a setting section that sets the setting information based on a test result to achieve communicable transmission quality.

9. The information transmission device according to claim 8, wherein the reception waveform shaping section shapes the signal waveform by at least one of partially emphasizing the received signal waveform and partially attenuating the received signal waveform.

10. An information transmission method for transmitting information in an information transmission system including, a transmission path that transmits the information in serial, a first information transmission device including a transmitting section that transmits the information in the transmission path at a predetermined transmission speed and a controller that controls the transmitting section, and a second information transmission device including a receiving section that receives the information transmitted via the transmission path and a communication establishing section that establishes communication, the method comprising:
    transmitting, when establishing the communication, predetermined first information in the transmission path, the first information including a same value in successive plurality of bits;
    establishing the communication based on the first information, when the receiving section receives the first information; and
    controlling, by the controller, the transmitting section to transmit second information including a portion where value of each bit changes per bit, after the transmission of the first information,
    wherein the second information transmission device:
        a test section that tests a transmission quality based on the second information received at the receiving section,
        a reception waveform shaping section that shapes a signal waveform of the information received by the receiving section in accordance with setting information, and
        a setting section that sets the setting information based on a test result to achieve communicable transmission quality.

11. The information transmission method according to claim 10, further comprising:
    controlling, by the controller, each time the second information is transmitted predetermined number of times, the transmitting section to transmit predetermined third information including a same value in successive plurality of bits; and
    changing the setting information, by the setting section, when the third information is received at the receiving section.

12. The information transmission method according to claim 10, further comprising:
    controlling, by the controller, to transmit fourth information including a same value in successive plurality of bits and instructing to change the setting information; and
    changing the setting information, by the setting section, when the fourth information is received at the receiving section.

13. The information transmission method according to claim 10, wherein the transmission path includes a first transmission path that transmits the information from the first information transmission device to the second information transmission device and a second transmission path that transmits the information from the second information transmission device to the first information transmission device, the second information transmission device further includes a test result transmitting section that transmits fifth information that includes a same value in successive plurality of bits and that shows the test result of the test section, and the first information transmission device further includes a test result receiving section that receives the fifth information and a transmission waveform shaping section that shapes a signal waveform of the information transmitted, the method further comprising:

transmitting, by the transmitting section, the information to the first transmission path;

receiving, by the receiving section, the information transmitted via the first transmission path;

transmitting, by the test result transmitting section, the fifth information to the second transmission path at the transmission speed; and     shaping, by the transmission waveform shaping section, a signal waveform of the information transmitted from the transmitting section based on the fifth information.

14. The information transmission method according to claim 10, wherein the reception waveform shaping section shapes the signal waveform by at least one of partially emphasizing the received signal waveform and partially attenuating the received signal waveform.

15. A computer readable medium storing a program causing an information transmission system to execute a process for information transmission, the information transmission system including, a transmission path that transmits the information in serial, a first information transmission device including a transmitting section that transmits the information in the transmission path at a predetermined transmission speed and a controller that controls the transmitting section, and a second information transmission device including a receiving section that receives the information transmitted via the transmission path and a communication establishing section that establishes communication, the process comprising:

transmitting, when establishing the communication, predetermined first information in the transmission path, the first information including a same value in successive plurality of bits;

establishing the communication based on the first information, when the receiving section receives the first information; and     controlling, by the controller, the transmitting section to transmit second information including a portion where value of each bit changes per bit, after the transmission of the first information,     wherein the second information transmission device:

a test section that tests a transmission quality based on the second information received at the receiving section,         a reception waveform shaping section that shapes a signal waveform of the information received by the receiving section in accordance with setting information, and         a setting section that sets the setting information based on a test result to achieve communicable transmission quality.

16. The computer readable medium storing the program causing the information transmission system to execute the process for information transmission according to claim 15, wherein the reception waveform shaping section shapes the signal waveform by at least one of partially emphasizing the received signal waveform and partially attenuating the received signal waveform.

17. A computer readable medium storing a program causing a computer to function as:

a controller that controls a transmitting section, that transmits information at a predetermined transmission speed in a transmission path that transmits the information in serial, to transmit predetermined first information in the transmission path when establishing communication, the first information including a same value in successive plurality of bits, wherein     the controller, after transmission of the first information, controls the transmitting section to transmit second information including a portion where value of each bit changes per bit, and     the first and second information are received by a second information transmission device that includes:

a test section that tests a transmission quality based on the second information received,         a reception waveform shaping section that shapes a signal waveform of the information received in accordance with setting information, and         a setting section that sets the setting information based on a test result to achieve communicable transmission quality.

18. The computer readable medium storing the program according to claim 17, wherein the reception waveform shaping section shapes the signal waveform by at least one of partially emphasizing the received signal waveform and partially attenuating the received signal waveform.

19. A computer readable medium storing a program causing a computer to function as:

a communication establishing section that establishes communication based on predetermined first information, when a receiving section that receives the information transmitted via a transmission path that transmits the information in serial, receives the first information including a same value in successive plurality of bits;

a test section that tests a transmission quality based on second information received at the receiving section;

a reception waveform shaping section that shapes a signal waveform of the information received by the receiving section in accordance with setting information; and     a setting section that sets the setting information based on a test result to achieve communicable transmission quality.

20. The computer readable medium storing the program according to claim 19, wherein the reception waveform shaping section shapes the signal waveform by at least one of partially emphasizing the received signal waveform and partially attenuating the received signal waveform.

* * * * *